May 5, 1970  KENJI SATO  3,510,464
PROCESS FOR THE PREPARATION OF SAPONIFIED HOMOPOLYMERS OF VINYL
ACETATE AND COPOLYMERS AND VINYL ACETATE
Filed April 5, 1968

INVENTOR
KENJI SATO

BY Sherman + Shalloway
ATTORNEY 3,510,464
**PROCESS FOR THE PREPARATION OF SAPONI-
FIED HOMOPOLYMERS OF VINYL ACETATE
AND COPOLYMERS AND VINYL ACETATE**
Kenji Sato, Kurashiki, Japan, assignor to Kurashiki Rayon
Co., Ltd., Kurashiki, Japan, a corporation of Japan
Filed Apr. 5, 1968, Ser. No. 719,079
Int. Cl. C08f 1/88
U.S. Cl. 260—87.3                                    8 Claims

ABSTRACT OF THE DISCLOSURE

An improved process for the preparation of entirely or partially saponified polyvinyl acetate or vinyl acetate-ethylene copolymer, by polymerizing vinyl acetate alone or with ethylene in an organic solvent in the presence of a free radical polymerization catalyst, heating the resultant reaction mixture to evaporate the organic solvent, adding at least an equimolar amount of a lower aliphatic saturated alcohol based on the acetic acid radical in the polymer and saponifying the product in the presence of an alkali catalyst, such process being characterized in that the polymerization is performed in tertiary butanol as the organic solvent, until the conversion of vinyl acetate reaches 15-90% by weight, the improvement being the addition of normal or basic cupric acetate to the polymeric mixture prior to recovery of solvent and unreacted vinyl acetate, the normal or basic cupric acetate being added in an amount sufficient to prevent the formation of aldehyde and acetic acid ester side products. Such process has the advantages that the recovered solvent and vinyl acetate are useful without any intervening purification and the saponified polymers have excellent whiteness.

---

Figure 1:
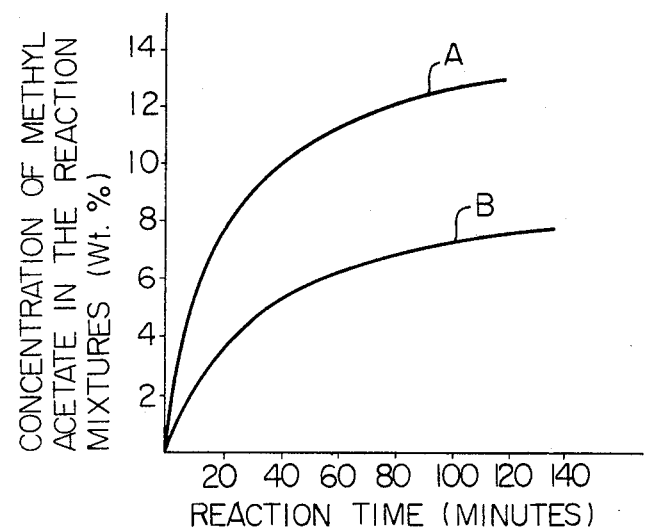

This invention relates to a process for the preparation of saponified homopolymers of vinyl acetate or copolymers of ethylene and vinyl acetate.

More particularly, the invention relates to a novel process for the preparation of saponified polyvinyl acetate or vinyl acetate-ethylene copolymer containing no more than 80 mol percent of ethylene, which comprises polymerizing vinyl acetate or a vinyl acetate-ethylene mixture of an organic solvent by solution polymerization method, separating the formed polymer from the organic solvent and unreacted vinyl acetate, and saponifying the polymer.

Polyvinyl alcohol, or saponified vinyl acetate-ethylene copolymers are normally obtained by saponifying homopolymers or copolymers of vinyl acetate. In that case, if unreacted vinyl acetate remains in the polymerization reaction mixture, the saponified polymer is objectionably colored.

In order to prevent such phenomena, it is desirable to increase the conversion of vinyl acetate in the polymerization reaction closely to 100%, and to use that polymerization product as the starting material in the saponification reaction. However, such complete polymerization requires an extremely long period and therefore inefficient, since the reaction rate decreases with the conversion of vinyl acetate and becomes to very small value when the conversion is near 100%.

Therefore, substitution of the monomer in the reaction mixture with solvent before completion of the polymerization has been proposed, which is performed, for instance, as follows: a polyvinyl acetate solution containing unreacted monomer is continuously fed into the top portion of a rectifier-type column while an alcoholic vapor is supplied into the column from the bottom. Thus from the top an alcoholic solution of vinyl acetate is recovered, and from the bottom, an alcoholic solution of polyvinyl acetate is obtained, i.e., vinyl acetate is substituted with alcohol. However, in the above process, if methanol or ethanol is used as the alcohol, the vinyl acetate thereby replaced contains very minor amounts of aldehydes and acetic acid esters formed by the reaction with such alcohol. Repetitive recycling of such vinyl acetate, therefore, causes accumulation of the impurities therein, which in turn lowers the conversion of the material to polyvinyl acetate, and also causes coloration of the product polymers.

From the foregoing reasons, it can be understood that, in the preparation of polyvinyl acetate or vinyl acetate-ethylene copolymer, if the reaction is suspended incomplete and unreacted vinyl acetate is recovered from the reaction mixture, the vinyl acetate monomer must be carefully isolated and purified before its recycling use.

As the means for separation and purification of vinyl acetate monomer, simple distillation is insufficient, since if a lower alcohol such as methanol or ethanol is used as the organic solvent in the preparation of polyvinyl acetate or vinyl acetate-ethylene copolymer, the alcohol forms an azeotropic mixture with vinyl acetate. In that case, the separation of vinyl acetate from the alcohol is achieved by extractive distillation using water as the separating agent. Furthermore, thus recovered vinyl acetate must be further distilled to be removed of the impurities therein, such as aldehydes, methyl or ethyl acetate, etc. Whereas, such extractive distillation and additional distillation procedures involve considerable expenses, and are by no means acceptable to the industry.

The above objection is effectively eliminated by the present invention. The object of the invention, therefore, is to provide an economically advantageous process for the preparation of colourless, saponified high homopolymer of vinyl acetate or copolymer of vinyl acetate and ethylene, in which the loss of vinyl acetate is prevented and the above-mentioned refining procedures of the vinyl acetate are completely omitted, and furthermore the required heat is reduced.

Other objects of the invention will become apparent from reading the following descriptions.

The above objects and advantages of the invention are accomplished by the process which comprises polymerizing vinyl acetate alone or together with ethylene in an organic solvent in the presence of a polymerization catalyst to form polyvinyl acetate or vinyl acetate-ethylene copolymers containing no more than 80 mol percent of ethylene, evaporating the organic solvent by heating the reaction mixture, adding to the resultant polymer a lower aliphatic saturated alcohol, and saponifying the product in the presence of an alkali catalyst, thereby forming completely or partially saponified polyvinyl acetate or vinyl acetate-ethylene copolymer, characterized in that the polymerization is performed in tertiary butanol as the rganic solvent, until the conversion of vinyl acetate to he polymer reaches 15–90% by weight, and normal or asic cupric acetate is added to the reaction mixture to be eated together so that the tertiary butanol and vinyl cetate monomer are evaporated and recovered.

Hereinafter the subject process will be explained in further details by the order of the sequential steps, in comparison with conventional processes.

1) PREPARATION OF POLYVINYL ACETATE OR VINYL ACETATE-ETHYLENE COPOLYMER

Solution polymerization of vinyl acetate alone, or together with ethylene, in an organic solvent such as methanol in the presence of a polymerization catalyst is known. As the catalyst, for example, the following are known to e useful: nitrogen compounds which form free radicals pon thermal decomposition, such as $\alpha,\alpha'$-azo-isobutyronitrile, $\alpha,\alpha,'$ - azobis($\alpha,\gamma$ - dimethylvaleronitrile), $\alpha,\alpha'$-zo-diisobutyric acid dinitrile, etc.; and organic peroxides uch as benzoyl peroxide and lauroyl peroxide.

According to the invention, in the preparation of polyinyl acetate or vinyl acetate-ethylene copolymers conaining no more than 80 mol percent of ethylene (hereinfter they may be referred to briefly as vinyl acetate-ethylne copolymers) by polymerization of vinyl acetate alone r together with ethylene in an organic solvent in the resence of any of the above known catalysts, tertiary utanol is used as the organic solvent, and the polymerizaion reaction is suspended when the conversion of vinyl cetate to the polymer reached 15–90% by weight.

The polymerization step in accordance with the invenion can be performed, for example, by charging a polymrization vessel with tertiary butanol and any of the fore;oing catalysts, adding a predetermined amount of vinyl cetate, and heating the system to 40–60° C. normally at tmospheric pressure. The pressure may be elevated if deired. For copolymerization of vinyl acetate with ethylene, ι predetermined amount of ethylene is supplied to the bove polymerization system of vinyl acetate, according to he desired copolymerization ratio, with the ethylene pressure suitably adjusted. The copolymerization ratio is determined by such factors as polymerization temperature, thylene pressure and the quantitative ratio between vinyl cetate and ethylene in the system. These specific condiions can be easily determined through experiments.

The lower limit of the ratio of tertiary butanol, which s the solvent, to vinyl acetate is determined by the minnum necessary amount of the solvent for smooth progress f the polymerization, while preventing or reducing fornation of cross-linked polymers, viscosity rise in the rection mixture and difficulties in removing the heat of poymerization caused by high viscosity. Whereas, the upper, limit is determined by the economical factor, i.e., the point past which the volume efficiency of the polymerizaion vessel cannot stand a practical use. The preferred atio of tertiary butanol to vinyl acetate monomer for practicing the invention ranges 0.1 to 7 on weight basis.

Conventionally, in majority of the cases methanol is used as the organic solvent in the polymerization of vinyl acetate on industrial scales, since it is the least expensive, and methanol solutions of polyvinyl acetate have low viscosities convenient for transportation. However we discovered that methanol solvent is subject to numbers of objections, and that the use of tertiary butanol achieves surprising various advantages.

(2) SEPARATION OF VINYL ACETATE MONOMER AND ORGANIC SOLVENT FROM THE PRODUCT POLYMER

According to the invention, subsequently the reaction mixture resulted from the above polymerization is heated, so that the tertiary butanol and unreacted vinyl acetate are evaporated, and recovered by condensation, whereby separating them from the polyvinyl acetate or vinyl acetate-ethylene copolymer formed of the foregoing polymerization.

The heating of the polymerization mixture may be carried out at a temperature higher than the boiling point of vinyl acetate under the operation pressure but lower than 150° C. Further, the heating may be carried out under an atmospheric or reduced pressure. In short, the heating may be carried out at any temperature where tertiary butanol and vinyl acetate are efficiently evaporated and the reaction between vinyl acetate and tertiary butanol does not substantially occur.

Any vessel to be usually used for treating highly viscous materials may be available as the container used in said heating. For instance, a thin film evaporator or an apparatus with a scrapper for concentrating highly viscous materials can be used.

As previously described, the reaction mixture still contains a considerable amount of monomeric vinyl acetate. Therefore, in accordance with the invention, normal cupric acetate $[Cu(CH_3COO)_2]$ or basic cupric acetate $[Cu(CH_3COO)_2CuO]$ is added to the reaction mixture in advance of the heating, in an amount of $$1 \times 10^{-5} - 5 \times 10^{-1}\%,$$

preferably $1 \times 10^{-4} - 5 \times 10^{-2}\%$, by weight of the latter. Thus during the subsequent heating of the mixture for evaporation and recovery of monomeric vinyl acetate and tertiary butanol therefrom, polymerization of vinyl acetate is prevented effectively, and furthermore the reaction between vinyl acetate and tertiary butanol does not occur even in the presence of the above-mentioned copper salt. Therefore, objectionable side formation of aldehydes and acetic acid esters is substantially prevented. Consequently, the saponification of thus separated polyvinyl acetate or vinyl acetate-ethylene copolymer will yield pure white products free of objectionable colors. Furthermore, the liquid mixture of the monomeric vinyl acetate and tertiary butanol recovered is substantially free of any side product, and can be recycled to the polymerization system without intervening purification.

(3) SAPONIFICATION OF POLYVINYL ACETATE OR VINYL ACETATE-ETHYLENE COPOLYMER

According to the invention, the polyvinyl acetate or vinyl acetate-ethylene copolymer thus separated in the above step is formed into a homogeneous solution or a suspension in which the polymer is uniformly dispersed, by addition thereto of at least equimolar amount, preferable at least 2 mols, per mol of the acetic acid radicals in the polymer, of an aliphatic saturated alcohol having 1–4 carbon atoms, and still other organic solvent if necessary, in accordance with the conventional practice. To the solution then the required amount of alkali is added to entirely or partially saponify the polymer or copolymer, and the saponified product is duly recovered. The specific type of alcohol to be added to the reaction mixture is essentially not critical, so far as it is capable of inducing saponifying reaction of the polymer. Normally aliphatic saturated alcohols having 1–4 carbon atoms are used because of easy availability and handling, as well as low cost. The quantity of the alcohol neither is critical, so far as it allows easy recovery of the saponified product.

As the optionally added organic solvent, for example, aromatic organic solvent such as benzene, toluene, etc. may be used. Concurrent use of such organic solvent with the alcohol is useful for improving solubility of the vinyl acetate-ethylene copolymer. For example, the copolymers containing no more than 61 mol percent of copolymerized ethylene are soluble in methanol, but copolymers of higher ethylene contents are partially soluble or insoluble in methanol. In the latter case, it is preferred to add an aromatic organic solvent such as benzene or toluene to methanol, in order to improve the solubility of the copolymer.

As the alkali to be used in the saponification reaction, for example, alkali hydroxides such as caustic soda and potash, lower alcoholates of alkali metals such as sodium methylate and ethylate, etc., are suitable. The amount of the alkali is suitably determined, depending on the required degree of saponification, copolymerization ratio of vinyl acetate to ethylene, etc. Generally speaking, greater amount of alkali is required for saponification of vinyl acetate-ethylene copolymer, than that for saponification of polyvinyl acetate. The preferred temperature for the saponification is in the range of room temperature to 140° C.

The entirely or partially saponified polyvinyl acetate or vinyl acetate-ethylene copolymer formed by the above saponification may precipitate in the reaction liquid, or remain as dissolved, or partially precipitate and partially remain dissolved in the liquid, depending on such factors as the degree of saponification of the product, copolymerization ratio of vinyl acetate to ethylene, etc.

If all of the saponified product precepitate, it can be separated by known filtration method. If the whole or part of the product still remains in the reaction liquid as dissolved, another suitable nonsolvent is added to the system to cause the precipitation of the saponified product. The precipitate can be recovered by filtration. Thus obtained product may be further removed of the liquid component if necessary, dried and used as the final product of the invention. The recovery of the saponified product can be performed by any known means.

As in the foregoing, the characteristics of the invention reside in the use of tertiary butanol as the organic solvent in the polymerization of vinyl acetate or copolymerization of vinyl acetate with ethylene; suspension of the polymerization reaction at a point when 15–90% by weight of the vinyl acetate present in the system is converted to the polymer or copolymer; and in the recovery process of tertiary butanol and unreacted vinyl acetate from the resultant reaction mixture, comprising adding normal or basic cupric acetate to the reaction mixture and heating the system, so as to evaporate and recover tertiary butanol and unreacted vinyl acetate.

In the past, it was attempted by the experts, in the evaporating for the recovery of unreacted vinyl acetate and organic solvent by heating the reaction mixture resulting from polymerization of vinyl acetate or copolymerization of vinyl acetate with ethylene in an organic solvent in the presence of a catalyst, to add a polymerization-retarder or -inhibitor to the reaction mixture in advance of the heating, in order to prevent polymerization of vinyl acetate during the heating.

However, most of conventional polymerization-inhibitors tend to bring about coloration in saponified products from polyvinyl acetate and vinyl acetate-ethylene copolymers during saponification thereof.

As a result of various attempts concerning the polymerization-inhibitors, the inventor of the present invention has arrived at a knowledge that cupric acetate normal or basic are much less liable to bring about the coloration and exhibits a far more excellent polymerization-inhibiting effect as compared with other conventional polymerization-inhibitors.

However, neither cupric acetate normal nor cupric acetate basic cannot escape from a defect that they promote exceedingly the reaction of vinyl acetate monomer with a lower alcohol such as methanol, ethanol, n-propanol, iso-propanol, n-butanol and sec.-butanol and as a result formation of acetic acid esters or aldehydes is increased. Therefore, the use of cupric acetate normal or cupric acetate basic as a polymerization-inhibitor could not but be relinquished in the polymerization system where polyvinyl acetate or a vinyl acetate-ethylene copolymer is prepared by using said lower alcohol as the solvent, despite that cupric acetate normal or cupric acetate basic has said advantage in respect to coloration.

Nevertheless, the inventor of the present invention has now found that tertiary butanol has a peculiar property that it cannot react with vinyl acetate at all at a temperature below 150° C. even if cupric acetal normal or cupric acetate basic is present.

Thus, the inventor of the present invention has now found that, in case tertiary butanol is particularly used as the organic solvent of the polymerization and cupric acetate normal or basic is used as the polymerization-inhibitor, the following advantages are brought about:

(1) the polymerization of vinyl acetate is substantially inhibited during the heating step;

(2) the reaction between tertiary butanol and vinyl acetate can be very effectively prevented;

(3) accordingly, the recovered liquid mixture of tertiary butanol and vinyl acetate can be repeatedly recycled to the initial polymerization step without an intervening purification step;

(4) the omission of the intervening purification step gives the advantage in reduction of the required heat; and (5) colorless or substantially colorless saponified products can be obtained through the saponification as described in the above.

For example, it is illustrated in FIG. 1 that, reaction of vinyl acetate with alcohols having 1 to 4 carbon atoms other than tertiary butanol, e.g., methanol, is conspicuous in the presence of cupric acetate, while the reaction does take place only slightly in the absence of catalyst. Referring to FIG. 1, the axis of abscissae denotes reaction time and that of ordinates, methyl acetate concentration formed in the reaction liquid. The curves A and B show the relation between the quantities of methyl acetate formed and reaction time, when 0.1% and 0.001% by weight, respectively, of $Cu(CH_3COO)_2 \cdot H_2O$ are added to the system. In both cases of A and B, the mol ratio of methanol to vinyl acetate is 1, and the reaction temperature is 55° C.

In contrast to the results indicated in FIG. 1, no reaction between tertiary butanol and vinyl acetate takes place below 150° C., even in the presence of normal or basic cupric acetate.

The process of this invention is based on the above unique discoveries as to tertiary butanol and vinyl acetate, and is therefore not applicable to lower alcohols of 1 to 4 carbon atoms other than tertiary butanol.

Figure 2:
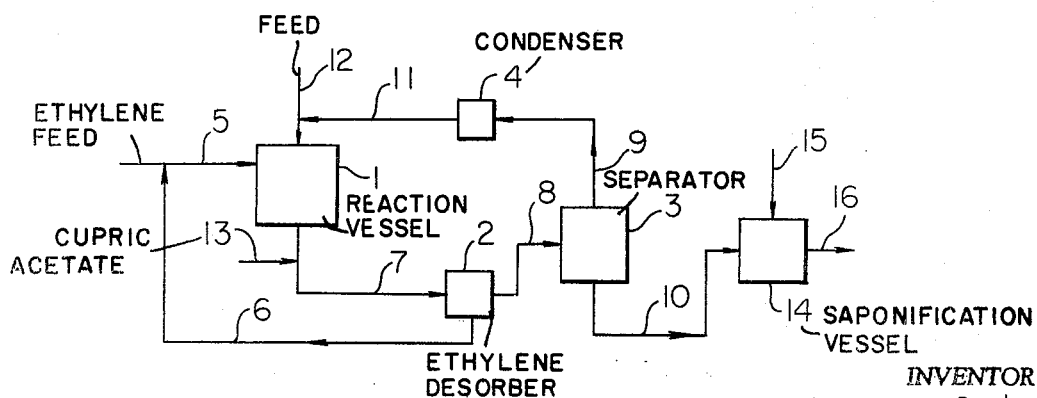

An embodiment of the subject process will now be explained with reference to the flow sheet given in FIG. 2. Vinyl acetate and tertiary butanol are fed to polymerization vessel 1 through pipe 12. Pipe 5 is for ethylene supply, which is used in case of copolymerization of vinyl acetate with ethylene. The polymerization is performed under the already described conditions, and the reaction liquid is transferred to ethylene desorber 2 through pipe 7, at the pipe 13 cupric acetate being added thereto in the form of, for example, a tertiary butanol solution of cupric acetate. In case of vinyl acetate-ethylene copolymerization, substantially the entire ethylene is desorbed in the vessel 2 by such means as reducing the pressure and the remaining system is sent to separator 3 through pipe 8. The separator consists of, for example a thin film evaporator or an apparatus suited for concentration of high viscous substance, for example, scraped wall reactor. The polymer or copolymer separated at the apparatus 3 is withdrawn through pipe 10. The unreacted vinyl acetate and tertiary butanol also separated at the apparatus 3 is sent to a condenser 4 through pipe 9, and the condensed solution is recycled through pipe 11, without intervening purification step. Whereas, the withdrawn polymer or copolymer is transferred to saponification vessel 14 and dissolved in methanol which is supplied from pipe 15. The saponified polymer or copolymer formed in the presence of an alkali catalyst is withdrawn through pipe 16.

Thus in accordance with the invention, polyvinyl acetate or vinyl acetate-ethylene copolymer containing no more than 80 mol percent of ethylene, which is saponified to any desired degree and is free of coloration, is obtained with economical advantages. The entirely or partially saponified products possess wide range of utilities, as starting materials for fibers, films and other shaped products, or as paint base, etc.

Particularly because the saponified products of the copolymer containing no more than 80 mol percent of ethylene exhibit little oxygen-permeability, they are useful as the starting material for oxygen-shielding shaped products, such as food-packaging film, etc.

Examples 1, 2 and Controls 1–9

With these examples, the excellent polymerization-inhibiting action of normal or basic cupric acetate is illustrated in comparison with other known inhibitors, and that the inhibitor of this invention is useful to drastically reduce the degree of coloration in the saponified polyvinyl acetate or ethylene-vinyl acetate copolymer, even after thermal treatments.

A vinyl acetate-tertiary butanol mixture, in which the weight ratio of tertiary butanol to vinyl acetate was 0.65, was supplied to a polymerization vessel, and continuously copolymerized with ethylene at an ethylene pressure of 36 kg./cm.$^2$G, at 60° C., in the presence of azobis-isobutyronitrile as the catalyst. From the reaction mixture continuously withdrawn from the polymerization vessel, the ethylene absorbed was desorbed. The remaining solution consisted of 47 wt. parts of ethylene-vinyl acetate copolymer, 54 wt. parts of tertiary butanol, and 40 wt. parts of unreacted vinyl acetate. To that reaction mixture, each of the polymerization-inhibitors listed in Table 1 was added in an amount of $5 \times 10^{-3}$ wt. percent of the vinyl acetate, and each resultant mixture was sent to the polymer-separator. At 110° C. and 600 mm. Hg, the unreacted vinyl acetate and tertiary butanol were removed, and the copolymer was continuously withdrawn. The ethylene content of the copolymer was, in all cases 35 mol percent. The copolymer was dissolved into methanol in such an amount that the concentration thereof was 22% by weight. After caustic soda was added to the polymer solution in such an amount that the mol ratio of the caustic soda to the acetic group contained in the copolymer was 0.3, the saponification was carried out at a temperature of 60° C. over a period of 2.5 hours. The resulting saponified product exhibited a saponification degree of 98.5 mol percent.

Thus obtained saponified polymer was shaped into pellets by conventional melt-extrusion, and the coloration thereof was judged on the stimulus value Z which was measured the surface color by a reflection method and was indicated in accordance with JIS Z8701. The rating of the degree of coloration was given as indicated in Table 2.

The polymeric pellets were shaped into 60 cm.-wide films through a melt-extruder equipped with a T-shaped die, and the number of fish eyes in each film was counted. The results were expressed as the rating numbers in accordance with Table 3. The number of fish eyes has the following significance.

Since in the step of separating unreacted monomeric vinyl acetate and tertiary butanol, ethylene has been already desorbed and eliminated, if the polymerization-inhibiting effect of the inhibitor added is small, homopolymer and homo-oligomer of vinyl acetate is formed and mixed into the ethylene-vinyl acetate copolymer. Therefore, when the saponified polymeric mixture is formed into a film, both saponified ethylene-vinyl acetate copolymer and saponified vinyl acetate homopolymer would be present in the film. Since the two polymers have little compatibility, the film would develop fish eyes. Accordingly, the number of fish eyes in a film denotes the degree of effectiveness of the polymerization-inhibitor employed.

TABLE 1.—DEGREE OF COLORATION- AND POLYMERIZATION- INHIBITING EFFECTS OF POLYMERIZATION-INHIBITORS

| Run | Polymerization-inhibitor | Degree of coloration of pellet | Rating of fish eyes in film |
|---|---|---|---|
| Example 1 | Cupric acetate (normal) | I | I |
| Example 2 | Cupric acetate (basic) | I | I |
| Control 1 | Copper naphthenate | IV | III |
| Control 2 | Cupric chloride | IV | I |
| Control 3 | Copper resinate | IV | III |
| Control 4 | Cupric sulfate (anhydrous) | IV | III |
| Control 5 | Cupric nitrate | IV | I |
| Control 6 | Cuprous acetate | I | V |
| Control 7 | Hydroquinone | V | IV |
| Control 8 | Thiodiphenylamine | V | IV |
| Control 9 | Thiourea | III | IV |

TABLE 2

Index number of degree of coloration      Stimulus value Z*

I ------------------------------- $45 \leq Z \leq 100$
II ------------------------------ $35 \leq Z < 45$
III ----------------------------- $25 \leq Z < 35$
IV ------------------------------ $15 \leq Z < 25$
V ------------------------------- $0 \leq Z < 15$

*Stimulus values Z were obtained by measuring the surface color of the sample pellets having a thickness of 8–10 mm. by a reflection method in accordance with JIS Z8701.

TABLE 3

Rating of fish eyes in film      Number of fish eyes present in 100 cm.$^2$ of film I ------------------------------- Less than 15
II ------------------------------ 15–80
III ----------------------------- 80–150
IV ------------------------------ 150–300
V ------------------------------- More than 300

From the results given in Table 1, it can be understood that normal and basic cupric acetate used as the polymerization-inhibitors in accordance with this invention exhibit much higher inhibiting action than those of other inhibitors, and at the same time the saponified copolymers of our examples are substantially free of coloration. Whereas, monovalent cuprous acetate (not within the polymerization-inhibitor of this invention) showed good result as to the coloration, but had an extremely inferior effect as to inhibition of polymerization. Thus the same is unsatisfactory for practical use.

Example 3 and Controls 10–13

To equimolar mixtures of various lower aliphatic alcohols with vinyl acetate, 0.1 wt. percent based on each mixture of normal or basic cupric acetate was added, and each system was reacted at 55° C. for 60 minutes and 120 minutes. The quantity of acetic acid ester thus formed by the ester-interchange reaction between vinyl acetate and each specified alcohol was determined. The results are shown in Table 4 below:

TABLE 4.—ACETIC ACID ESTER IN REACTION LIQUID (PERCENT BY WEIGHT)

| | | Cupric salt | | | |
|---|---|---|---|---|---|
| | | Normal cupric acetate | | Basic cupric acetate | |
| | | Reaction time | | | |
| Run | Solvent | 60 minutes | 120 minutes | 60 minutes | 120 minutes |
| Example 3 | t-Butanol | Trace | Trace | Trace | Trace |
| Control 10 | Methanol | 11.2 | 13.0 | 10.6 | 12.4 |
| Control 11 | Ethanol | 8.7 | 10.2 | 8.1 | 9.5 |
| Control 12 | n-Propanol | 7.5 | 9.2 | 7.2 | 8.5 |
| Control 13 | sec.-Butanol | 6.1 | 8.3 | 5.8 | 7.6 |

The results of the table above clearly indicate that in the presence of normal or basic cupric acetate, esterinterchange reaction between lower aliphatic alcohols excepting tertiary butanol and vinyl acetate does take place to a considerable degree, but tertiary butanol is outstanding in that it performs none of such reaction. For this reason it is possible to achieve the very favorable results of this invention, by the concurrent use of tertiary butanol as the polymerization solvent, with normal or basic cupric acetate or a mixture thereof as the polymerization-inhibitor.

Example 4

Vinyl acetate was supplied to a polymerization vessel while the mixture of vinyl acetate and tertiary butanol which was separated from the reaction mixture and withdrawn from the vessel was recycled to the same vessel, and as a whole the weight ratio of tertiary butanol to vinyl acetate was adjusted to 0.45. The polymerization was performed continuously at 40° C. and atmospheric pressure, in the presence of azo-bis-isobutyronitrile as the catalyst. The resultant reaction liquid consisted of 46 wt. parts of vinyl acetate, 45 wt. parts of tertiary butanol and 54 wt. parts of polyvinyl acetate. To the reaction liquid, 0.001 wt. percent thereof of normal cupric acetate was added, and the system was transferred into a polymer separator. Under the conditions of 110° C. and 600 mm. Hg., unreacted vinyl acetate and tertiary butanol were removed, and polyvinyl acetate was continuously withdrawn. Whereas, the mixture of vinyl acetate and tertiary butanol recovered in that stage was recycled into the polymerization vessel without purification. The polyvinyl acetate was dissolved into methanol to form a solution having the polymer concentration of 10% by weight. After caustic soda was added to the polymer solution in such an amount that the mol ratio of the caustic soda to the acetic group in the polymer was 0.01, the saponification of the polymer was carried out at a reaction temperature of 50° C. for 30 minutes. The degree of saponfication of the product was 99%. The average degree of polymerization of the product was 5,200. Even when the weight ratio of the formed polymer to the tertiary butanol employed reached $10^3$, no formation or accumulation of reaction product of vinyl acetate and tertiary butanol was observed in the recycling mixtures of vinyl acetate and tertiary butanol. Said saponified product was pelletized using water as an assistant, and the coloration of the pellet was measured by a method reflecting the surface color in accordance with JIS Z8701. As a result, the pellet was observed to have a stimulus value Z of 49. No coloration of the saponified product was observed.

Example 5

Example 4 was repeated except the following: basic cupric acetate was added as the polymerization-inhibitor, in an amount of 0.01%, and the mixture of unreacted vinyl acetate and tertiary butanol was separated from polyvinyl acetate at 120° C., and 750 mm. Hg. Even when the weight ratio of the polymeric product to the tertiary butanol employed reached $5 \times 10^3$, still no accumulation of reaction product of vinyl acetate and tertiary butanol was recognized. The stimulus value Z of the pellet of the so obtained saponified product measured in accordance with JIS Z8701 was 46, and there was hardly observed any coloration.

Example 6

Vinyl acetate was supplied into a polymerization vessel in combination with the recovered liquid mixture of vinyl acetate and tertiary butanol, at a weight ratio of tertiary butanol to vinyl acetate of 0.4. The polymerization was performed continuously at an ethylene pressure of 30 kg./cm.$^2$G and at 57° C., in the presence of azo-bis-isobutyronitrile as the catalyst. The reaction liquid continuously withdrawn from the polymerization vessel was first stripped of the ethylene absorbed, and then transferred into a polymer separator. The ethylene from the stripper was recycled to the polymerization vessel. The reaction liquid consisted of 52 wt. parts of ethylene-vinyl acetate copolymer, 40 wt. parts of tertiary butanol and 55 wt. parts of unreacted vinyl acetate. To the liquid, 0.005 wt. percent of normal cupric acetate was added, and the system was transferred to a polymer separator. At 115° C. and 650 mm. Hg, unreacted vinyl acetate and tertiary butanol were removed from the system, and remaining copolymer was continuously withdrawn. The ethylene content of the copolymer was 31.5 mol percent. The liquid mixture of the unreacted vinyl acetate and tertiary butanol was recycled into the polymerization vessel without any refining, similarly to the case of ethylene. The copolymer was dissolved into methanol to form a solution having the copolymer concentration of 25% by weight and to the solution caustic soda was added in such an amount that the ratio of the caustic soda to the acetate group in the copolymer was 0.3. Thereafter, the saponification was carried out at 60° C. for 3 hours. The degree of saponification of the product was 98%. The intrinsic viscosity of the saponified copolymer measured in aqueous phenol containing 15 wt. percent of water at 30° C., $[\eta]$, (hereinafter the measuring conditions of $[\eta]$ were identical) was 0.125 l./g.

Even when the weight ratio of the copolymer formed to the tertiary butanol used reached $4 \times 10^3$, no accumulation of reaction products of vinyl acetate with tertiary butanol was recognized in the liquid mixture recovered from the polymer separator. A film of 25$\mu$ thickness prepared from the saponified product demonstrated a fish eye number of 3 in 100 cm.$^2$. Further, the saponified product contained no polyvinyl alcohol incorporated therein. The stimulus value Z of the pellet prepared from the saponified product measured by a method reflecting the surface color in accordance with JIS Z8701 was 47, and no coloration was observed on the pellet.

Example 7

Example 6 was repeated except the following changes: the ethylene pressure was increased to 59 kg./cm.$^2$G; the initial weight ratio of tertiary butanol to vinyl acetate was 0.55, and the amount of normal cupric acetate was 0.01% to the reaction liquid. The reaction liquid stripped of ethylene consisted of 79 wt. parts of ethylene-vinyl acetate copolymer, 55 wt. parts of tertiary butanol and 45 wt. parts of unreacted vinyl acetate. The ethylene content of the copolymer was 57.2 mol percent and the degree of saponification of the product was 97%. The saponified product had an $[\eta]$ of 0.083 l./g. The stimulus value Z of the pellet prepared from the saponified product measured in the same manner as in Example 6 was 48.

Even when the weight ratio of the copolymer to the tertiary butanol employed reached $2 \times 10^3$, no accumulation of reaction product of vinyl acetate with tertiary butanol in the liquid mixture recovered from the polymer separator was recognized. The saponified product neither contained any polyvinyl alcohol mixed therein, and was free of coloration.

Example 8

Together with a recovered liquid mixture of vinyl acetate and tertiary butanol, vinyl acetate was fed to a polymerization vessel in such an amount that the weight ratio of the tertiary butanol to the vinyl acetate was 0.85. The continuous polymerization was carried out under an ethylene pressure of 85 kg./cm.$^2$ at a polymerization temperature of 60° C. in the presence as the catalyst of $\alpha,\alpha'$-azobisbutyronitrile. The amount used of the catalyst was 0.3% by weight based on the vinyl acetate fed. The reaction liquid continuously withdrawn from the polymerization vessel was stripped of the ethylene absorbed and then transferred into a polymer separator. The stripped ethylene was recycled to the polymerization vessel. The reaction liquid consisted of 83.5 parts by weight of ethylene-vinyl acetate copolymer, 80 parts by weight of tertiary butanol and 51.6 parts by weight of unreacted vinyl acetate. The ethylene content of the copolymer was 74.2 mol percent. To the liquid 0.03% by weight of cupric acetate normal, and the system was transferred to a polymer separator. At 117° C. and 610 mm. Hg unreacted vinyl acetate and tertiary butanol were recovered from the system and the remaining copolymer was continuously withdrawn. The so recovered liquid mixture of unreacted vinyl acetate and tertiary butanol was recycled into the polymerization vessel without refining thereof as the stripped ethylene was recycled.

Even when the weight ratio of the copolymer formed to the tertiary butanol used reached $10^2$, no accumulation of reaction products of vinyl acetate with butanol was recognized.

The so prepared copolymer was saponified by varying the saponification conditions as specified in Table A and saponified products having saponificatioin degrees shown in Table A were obtained from said copolymer. The saponified products having saponification degrees higher than 90 mol percent were respectively shaped into films of $25\mu$ thickness. The number of fish eyes appearing in each of the films was less than 10 in 100 cm.$^2$.

TABLE A

| Ethylene content in copolymer (mol percent) | 74.2 | 74.2 | 74.2 | 74.2 | 74.2 | 74.2 | 74.2 |
|---|---|---|---|---|---|---|---|
| Solvent in saponification system | (1) | (2) | (3) | (4) | (5) | (6) | (7) |
| Concentration of copolymer at the beginning of the reaction (wt. percent) | 20.5 | 21.0 | 20.7 | 22.0 | 22.0 | 22.0 | 21.5 |
| Time for saponification (hr.) | 3.1 | 3.0 | 5.0 | 3.0 | 5.0 | 2.0 | 6.5 |
| NaOH mol ratio[8] | 0.7 | 0.6 | 1.0 | 0.8 | 0.8 | 0.4 | 0.8 |
| Saponification temperature (° C.) | 65 | 60 | 65 | 63 | 65 | 70 | 70 |
| Saponification degree of saponification product (mol percent) | 85.8 | 90.8 | 96.3 | 97.4 | 88.2 | 42.2 | 95.1 |
| Coloration of saponified product[9] (pellet) | 47 | 46 | 49 | 49 | 48 | | 47 |
| Number of fish eyes in film ($25\mu$) prepared by melt shaping saponified product (per 100 cm.$^2$) | <10 | <10 | <10 | | <10 | | <10 |

[1] Methanol, 30 wt. percent, t-Butanol, 70 wt. percent.
[2] Methanol, 40 wt. percent, toluene, 60 wt. percent.
[3] Ethanol, 32 wt. percent, t-Butanol, 68 wt. percent.
[4] Methanol, 50 wt. percent, toluene, 50 wt. percent.
[5] Ethanol, 40 wt. percent, benzene, 60 wt. percent.
[6] t-Butanol, 100 wt. percent.
[7] n-Propanol, 50 wt. percent, toluene, 50 wt. percent.
[8] The mol ratio of the used caustic soda to the acetic group contained in the copolymer.
[9] Based on the stimulus value Z: which was obtained by measuring the surface color by a reflection method and was indicated in accordance with JIS Z8701.

As is clear from stimulus values Z shown in Table A above, there was hardly observed any coloration in pellets prepared from saponified products of the copolymer obtained in this example.

Example 9

The copolymer prepared by repeating the procedures of Example 7 was dissolved into a mixed solvent consisting of 75 parts by weight of methanol and 25 parts by weight of secondary butanol in such an amount that the concentration of the polymer was 23% by weight. To the so prepared copolymer solution was added sodium methylate in such an amount that the mol ratio of the sodium methylate to the acetic group contained in the copolymer was 0.03. The saponification was carried out at 60° C. over a period of 2 hours. The resulting saponified product had a saponification degree of 95.6 mol percent and an intrinsic viscosity $[\eta]$ of 0.120 liter/g. measured in phenol containing 15% by weight of water. The stimulus value Z of the pellet prepared from said saponified product was 46 and no coloration thereof was observed.

Even when the weight ratio of the copolymer formed to the tertiary butanol used reached $2 \times 10^2$, no accumulation of reaction products of vinyl acetate to tertiary butanol was recognized in the recovered mixture liquid of vinyl acetate and tertiary butanol. The number of fish eyes appearing on the film of $25\mu$ thickness prepared from the saponified product was only 5 per 100 cm.$^2$, and no incorporation of polyvinyl alcohols into the saponified product was observed.

Example 10

Example 4 was repeated except the solvent in the saponification of polyvinyl acetate was varied each time to ethanol, n-propanol, n-butanol, iso-butanol and sec.-butanol. In each case saponified polyvinyl acetate having a saponification degree of 97.99% was obtained similarly to Example 4. All the products were completely free from coloration.

I claim:
1. In a process for the preparation of entirely or partially saponified polyvinyl acetate or vinyl acetate-ethylene copolymer, by the steps of polymerizing vinyl acetate alone or together with ethylene in an organic solvent in the presence of a free-radical polymerization catalyst, to form polyvinyl acetate or vinyl acetate-ethylene copolymer containing no more than 80 mol percent of ethylene, heating the resultant reaction mixture to evaporate the organic solvent, adding to the polymeric product at least equimolar amount to the acetic acid radical in the polymeric product at least equimolar amount to the acetic acid radical in the polymer of a lower aliphatic saturated alcohol, and saponifying the product in the presence of a alkali catalyst, characterized in that the polymerization is performed in tertiary butanol as the organic solvent, until the conversion of vinyl acetate to the polymer reaches 15-90% by weight, the improvement in which normal or basic cupric acetate is added to the so obtained polymeric mixture in an amount sufficient to prevent the formation of aldehyde and acetic acid ester side products, the system being subsequently heated and the tertiary butanol and vinyl acetate monomer therein being evaporated and recovered.

2. The process according to claim 1 wherein the vinyl acetate monomer and the tertiary butanol are recycled as they are recovered and they are used for a next cycle.

3. The process according to claim 1 wherein the polymerization reaction is suspended when the conversion of the vinyl acetate into the polymer reaches 20-80%.

4. The process according to claim 1 wherein the ethylene content of the vinyl acetate-ethylene copolymer is below 61 mol percent.

5. The process according to claim 1 wherein the lower aliphatic saturated alcohol to be added at the saponification step is a member selected from aliphatic saturated alcohols having less than 4 carbon atoms.

6. The process according to claim 1 wherein the lower aliphatic saturated alcohol is methanol.

7. The process according to claim 1 wherein the heating for evaporating the vinyl acetate and the tertiary butanol is carried out at a temperature higher than the boiling point of vinyl acetate under the pressure adopted in the heating procedure but lower than 150° C.

8. The process according to claim 1 wherein the weight ratio of the tertiary butanol to the vinyl acetate is in the range of from 0.1 to 7 in the solution polymerization of the vinyl acetate.

References Cited
UNITED STATES PATENTS

| | | | |
|---|---|---|---|
| 2,467,234 | 4/1949 | Sargent et al. | 260—94.9 |
| 2,947,735 | 8/1960 | Bartl | 260—87.3 |
| 3,115,485 | 12/1963 | Bartl et al. | 260—87.3 |

JOSEPH L. SCHOTER, Primary Examiner

J. C. HAIGHT, Assistant Examiner

U.S. Cl. X.R.

260—91.3, 96